United States Patent [19]

Lare

[11] Patent Number: 4,590,467
[45] Date of Patent: May 20, 1986

[54] LOCAL AREA NETWORK INTERFACE CONTROLLER

[75] Inventor: Lawrence E. Lare, Cardiff-By-The-Sea, Calif.

[73] Assignee: Rockwell International Corporation, El Segundo, Calif.

[21] Appl. No.: 541,817

[22] Filed: Oct. 13, 1983

[51] Int. Cl.$^4$ .............................................. H04Q 9/00
[52] U.S. Cl. .................................. 340/825.5; 370/85
[58] Field of Search ........................ 340/825.5, 825.05; 370/85, 86; 178/71 R

[56] References Cited

U.S. PATENT DOCUMENTS

| | | | |
|---|---|---|---|
| 4,063,220 | 12/1977 | Metcalfe | 340/825.5 |
| 4,099,024 | 7/1978 | Boggs | 178/71 R |
| 4,379,294 | 4/1983 | Sutherland | 340/825.5 |
| 4,500,987 | 2/1985 | Hasegawa | 340/825.5 |
| 4,500,990 | 2/1985 | Akashi | 340/825.5 |

*Primary Examiner*—Donald J. Yusko
*Attorney, Agent, or Firm*—H. Fredrick Hamann; Daniel R. McGlynn; David J. Arthur

[57] ABSTRACT

A network controller includes an interface unit connected to a communication network channel for transferring data in the form of information packets to and from the channel; a receive buffer connected for storing in parallel form the data packets transferred from the communication channel; and first and second shift registers having n bit positions including a pointer bits to the receive buffer, circulating at different clock rates corresponding to the clock rate of data on said communication channel and the clock rate of the system bus.

3 Claims, 5 Drawing Figures

LOCAL AREA NETWORK INTERFACE CONTROLLER

BACKGROUND OF THE INVENTION

1. Field of the Invention

The present invention relates to data communication systems, and more particularly to local area network data communication systems based on packet communications.

2. Description of the Prior Art

The concept of local area networks is well known (IEEE Project 802, Local Area Network Standards, Draft IEEE 802.3 CSMA/CD Access Method and Physical Layer Specifications, Revision D, IEEE, New York, N.Y., December 1982) and U.S. Pat. No. 4,063,220 issued Dec. 13, 1977, and U.S. Pat. No. 4,099,024.

The traditional configuration for a computer network has been terminals which are controlled by a master computer which receives transmission requests from the respective terminals and grants access to a transmission channel by the individual terminals when the channel is available, usually according to some priority arrangement. The use of such master computers add to the cost of the terminal network and are not required for some networks in which the terminals need communicate only between themselves or with a common storage file. Thus, it is desirable to have a terminal network where the transmission control is imbedded in or shared by the stations making up that network.

Another type of network not having a master controller have employed "contention" schemes or protocol whereby each node of the network contends for the transmission medium whenever it is ready to transmit.

One of the advantages of contention protocols is that they efficiently utilize the available bandwidth on the transmission medium for computer terminal communications. Generally, contention systems permit a user to gain access to the entire channel bandwidth for his message burst. In operation, a user having a message to send is allowed to transmit his message whenever he is ready. In the event another user is presently transmitting over the channel, or does so during the first user's transmission, then a message collision occurs. The system users must sense these collisions and, in response, retransmit their respective messages. Some systems provide random delays before retransmissions to avoid "butting", i.e. continual collisions between users.

The contention protocols are particularly advantageous for computer terminal applications because they take advantage of the low duty cycle or "bursty" nature of data typically being transmitted from terminals and computers. For a large subscriber population of bursty users, the law of large numbers ensures that the channel bandwidth is only required to match the average aggregate data transmission rate of the entire population, rather than matching the sum of the peak rates for bursty subscribers as in the noncontention systems.

One of the earliest contention networks was the "Aloha" system of the University of Hawaii. In this system, each node transmitted whenever it had a packet ready for transmission. Whenever a portion of one node's transmission overlapped with another node's transmission, that overlap destroyed both packets. If the sending node did not receive an acknowledgment within another packet from the destination node after an arbitrary time period, it would assume that a collision had occurred and retransmit. In order to avoid continuously repeated collisions, some method of introducing a random transmission delay had to be introduced.

An attempt at reducing the effects of collision in contention-type networks is disclosed in the Metcalfe et al U.S. Pat. No. 4,063,220 which is directed toward a communication network in which each node is capable of detecting when collision occurs on the channel during that node's transmission, and interrupts its transmission when such a collision occurs. A random number generator is employed to select an interval of time to delay before the next attempted transmission. However, the collision detection mechanism adds to the complexity of the respective nodes with an increase in the cost of the system.

In order to lower the cost of implementation of local area network controllers, it is important to place as many components of the network controller on a single integrated circuit. Since the network controller interfaces between a computer operating at a fixed synchronous clock speed and the cable transceiver operating at a second clock speed the problem of timing and synchronization has presented itself. Prior to the present invention the usual approach toward the design of a local area network controller was to synchronize the computers interface signals with the controllers clock. The controller clock being derived from the cable transceiver data rate.

SUMMARY OF THE INVENTION

Briefly, and in general terms, the present invention provides a network controller in a data communications network having a plurality of information processing systems coupled to a communication channel. The network controller is interposed between the communication channel and an information processing system for transferring data in the form of information packets. The controller includes a de-serializer for converting data in the information packet received from the channel from serial form to parallel form; and a receive buffer connected for storing in parallel form the data from the information packet transferred from the communication channel.

Further included is a first shift register having n bit positions, and circulating at a first clock rate corresponding to the data rate of data on communication channel, where n corresponds to the number of memory locations in the receive buffer; and a second shift register having n positions and circulating at a second clock rate corresponding to the clock rate of said system bus, the second shift register functioning to point to the location in the receive buffer memory where data in the receive buffer memory is to be transferred to the system bus of the information processing system.

BRIEF DESCRIPTION OF THE DRAWINGS

FIG. 5 is a representation of the data fields in a data packet used in data communications in a local area network.

DESCRIPTION OF THE PREFERRED EMBODIMENT

Figure 1:
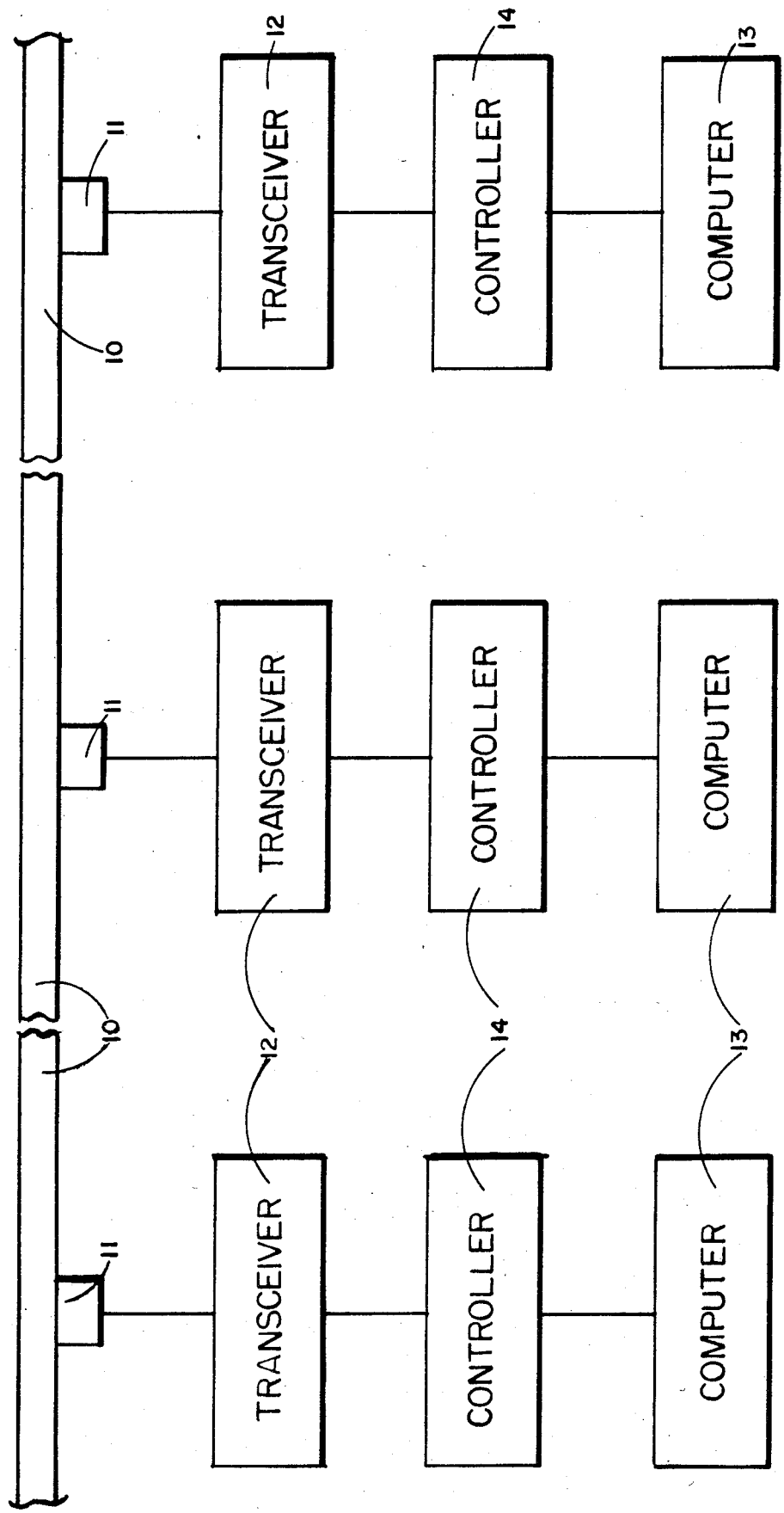
FIG. 1 is a highly simplified block diagram of a local area network showing three geographically remote computer units interfaced to the cable by means of a local area network controller and a transceiver.

FIG. 1 shows a local area packet communications network utilizing a conventional high frequency coaxial cable 10 known in the prior art. Distributed along the cable are various taps 11 which are used to connect transceivers 12 to the cable so that signals can be transmitted or received from the cable to a user device, such as an information processor or computer 13. In the embodiment according to the present invention the user device consists of a microcomputer, and a network controller 14 is used to interface the computer 13 with the transceiver 12.

Two types of cable networks are possible, a single cable or dual cable. In the single cable network the single cable acts as a broadcast media. Ethernet was so named because the single cable in an Ethernet network acts like the "ether" which was historically believed to be the medium in which electromagnetic waves were propagated. In the dual cable configuration, such as in a commercial implementation of Mitre Corporation, known as Mitrenet, one cable is used to transmit data while the other cable is used to receive data. Data is transmitted on the cable using Manchester or phase encoding in which each bit period is divided into two complementary halves. A positive going transition in the middle of the bit period corresponds to a data one, while a negative going transition corresponds to a data "O". Such encoding technique permits self-clocking so that the received data may be used to generate a clock signal in the transceiver.

The principal function of the network controller 14 is to couple the information processor to the communication medium or channel, and to provide an implementation of a communication channel access mechanism, such as the carrier sense multiple access/collision detection (CSMA/CD) algorithm, described in U.S. Pat. No. 4,063,220. During carrier sense the interface unit monitors the channel prior to transmission. If the presence of the carrier is sensed on the bus, the unit refrains from transmission until the channel is free. Collision detection is listening while talking so that the transmission station monitors while it is transmitting and stops transmitting if it detects destructive interference on the cable because of a collision between the transmitted data and transmitted data from another station. Back-off refers to the waiting or backing off for a specific period of time prior to retransmitting a specific frame or packet. In order that the cable be effectively utilized each interface must generate a different back-off period. This is done by a predetermined back-off algorithm. The binary exponentiation back-off algorithm of Ethernet causes the average retransmission interval to increase every time a collision takes place. One of the disadvantages of the CSMA/CD protocol is that the packets will more than likely collide immediately after frame transmission particularly in heavy traffic. One method of alleviating this result is to utilize another back-off algorithm when the cable is busy. Alternative access methods are known as p-persistent or non-persistent CSMA.

Figure 2:
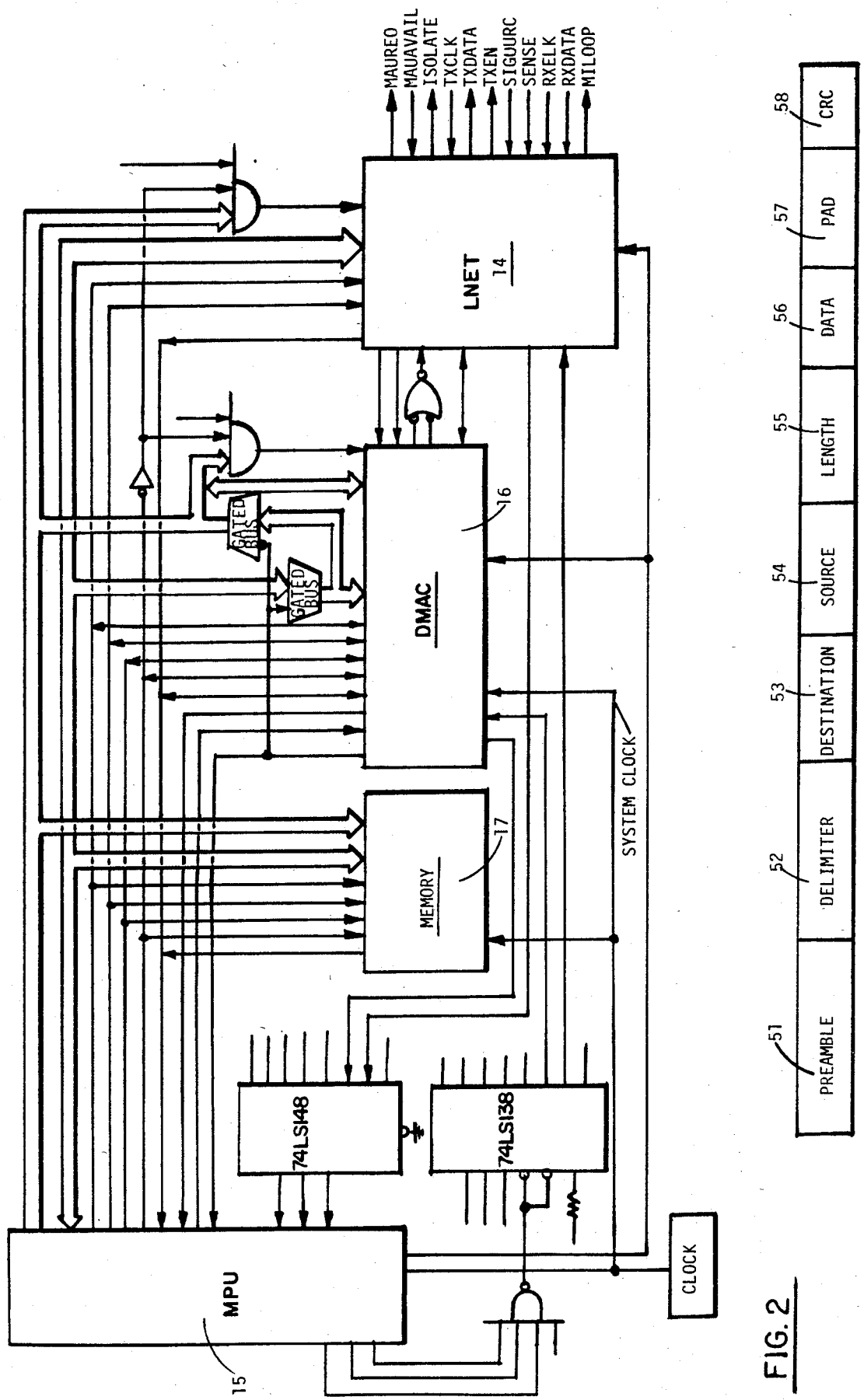
FIG. 2 is a block diagram of the interface between a local area network controller integrated circuit and a computer such as represented by a microprocessor.

Turning next to FIG. 2, there is shown a block diagram of the interface between the transceiver (not shown), the local area network controller implemented as an integrated circuit according to the present invention 14, and a microprocessor 15. The input and output signals to the network controller integrated circuit 14 are as follows:

| SYMBOL | SIGNAL NAME | DESCRIPTION |
| --- | --- | --- |
| GND | Ground | Ground |
| R/W | Read/Write | Defines the bus transfer as a read or write relative to the processor |
| RESET | Reset | Provides a hardware reset to the LNET for initialization |
| D0-D15 | Data | 16-bit data bus allowing byte (D0-D7) or word data transfers to the LNET |
| CS | Chip Select | Chip Select enables the chip and I/O buffers for MPU operations |
| IACK | Interrupt Acknowledge | Signals the LNET to provide a vector during an interrupt acknowledge cycle |
| DS | Data Strobe | Used to strobe data into and out of the LNET during MPU and DMAC operations |
| DTACK | Data Transfer Acknowledge | On a write to the LNET, DTACK indicates the data on bus has been latched. On a read from the LNET, DTACK indicates the LNET has valid data on the bus |
| IRQ | Interrupt | Used to request an interrupt upon detection of a condition that requires the attention of the processor |
| DONE | Done | A signal to or from the DMAC indicating that there is no more data to be transferred |
| DACK | DMA Acknowledge | Indicates that the bus has been acquired and that the requested bus cycle is beginning |
| RXREQ | Receive DMA Request | Output signal requesting a DMA transfer of received data |
| TXREQ | Transmit DMA Request | Output signal requesting a DMA transfer of data to be transmitted |
| MILOOP | MI Loopback | Output used to test the Manchester interface (MI) circuitry |
| RXDATA | Receive Data | Serial data input from the MI |
| RXCLK | Receive Clock | Timing signal provided by the MI for |

-continued

| SYMBOL | SIGNAL NAME | DESCRIPTION |
| --- | --- | --- |
| | | received data |
| SENSE | Carrier Sense | Input signal from the MI indicating the presence of received data |
| SIGQUAL | Signal Quality | Input from the MI indicating valid received data |
| TXEN | Transmit Enable | Output from the LNET indicating that transmit data is valid |
| TXDATA | Transmit Data | Serial output data from the LNET |
| TXCLK | Transmit Clock | Free running 10 MHZ clock input provided by the MI to time transmit data out |
| ISOLATE | Isolate | Output signal to the MI requesting that the MAU isolate itself from the medium |
| MAUAVAIL | MAU Available | Output from the MI indicating that the MAU is available |
| MAUREQ | MAU Request | Output from the LNET requesting the MAU |
| VCC | Power | +5 V power supply |

The network controller interfaces with a direct memory access controller such as a 68440 DMAC 15 shown in the Figure. The input and output signals to the DMAC 15 are as follows:

TXREQ/, RXREQ/, DACK/, DONE/ LNC

The system also provides a random access memory 16 such as represented by any number of random access memory integrated circuits. Finally, the central processor unit of the system is represented by the 68000 microprocessor. The input and output signals of the 68000 microprocessor are as follows:

LNC R-W/, D0-D15, IRQ/, DTACR/, DS/, IACK/

Figure 3:
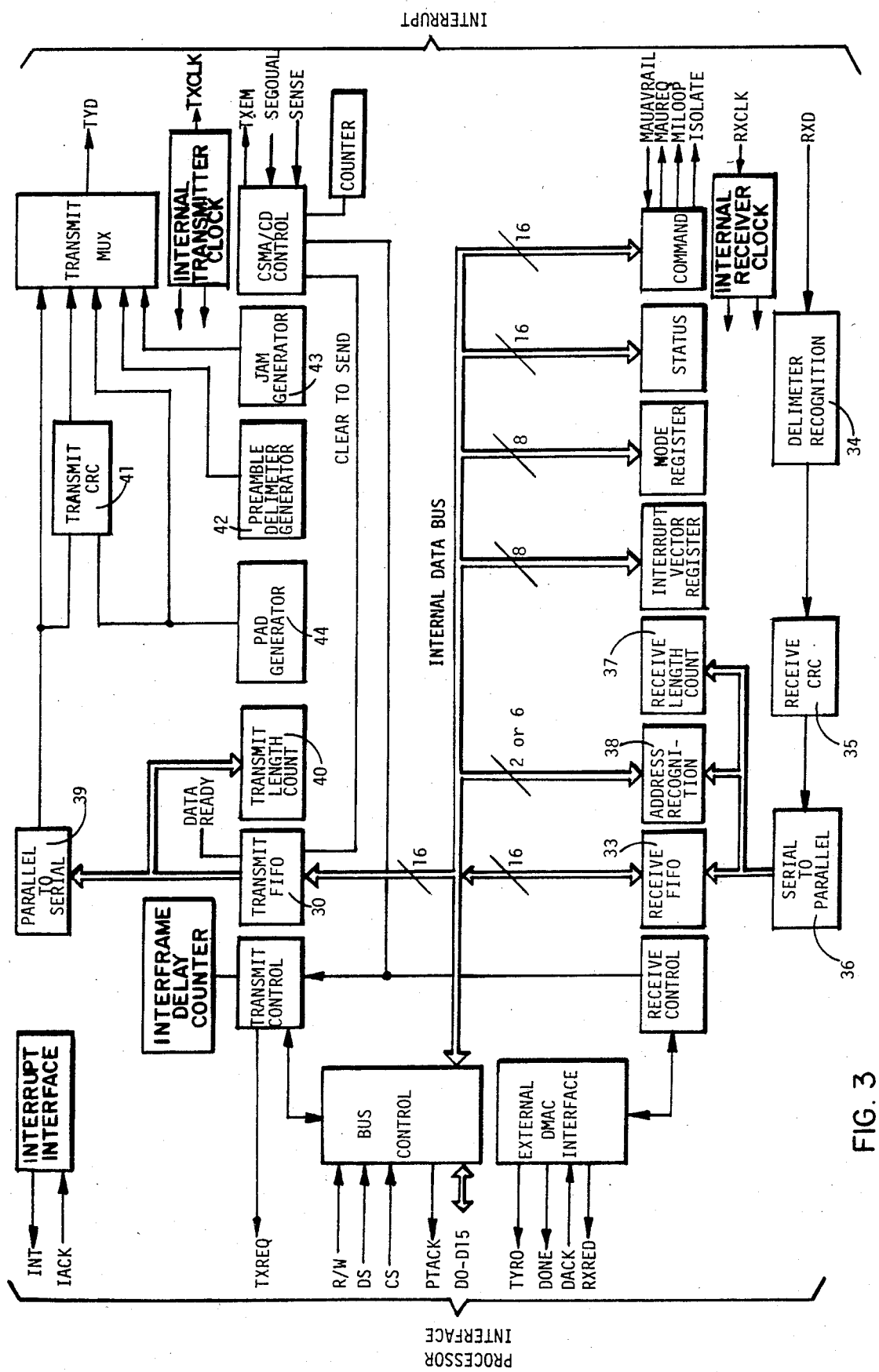
FIG. 3 is a highly simplified block diagram of the local area network controller implemented on a single integrated circuit according to the present invention.

Turning next to FIG. 3, there is shown a highly simplified block diagram of the local area network controller of the present invention. Reference is made to the various operative modules represented in the Figure for an explanation of the operation of the device.

The Address Register holds the Station Address for the Address Recognition circuitry. The Station Address bytes are written to the LNC following the Interrupt Vector during the initialization sequence.

The Transmitter data buffer 30 is a 32 byte FIFO data buffer which can be loaded from the data bus 31 only by DMA service. One half of the FIFO is used to load up data for transmission via the DMAC, and the other half to hold data currently being transmitted out serially on TXDATA.

It is a system design constraint that the time required to load half the transmitter buffer under DMAC control be less than the time it takes to serialize out the transmitting half of TXDATA. From the assertion of TXREQ' to the end of the 16th DMAC bus cycle no more than 128 TXCLKs may have elapsed.

When the transmitting half is empty it becomes the loading half and the current loading buffer becomes the transmitting half.

If the transmitting buffer is empty before the loading buffer is fully loaded IRQ' will be aserted and the transmitter buffer underflow bit of the Status Register 32 will be set.

The Receive data buffer 33 is a 32 byte FIFO data buffer which can be read only during DMA service. One half of the FIFO is a receiving buffer for the data from the S/P Register, the other half is a reading buffer for the data ready to be transferred to memory. As soon as the receiving buffer is full, these two halves switch roles.

It is a system design constraint that the time it takes to unload the reading buffer under DMAC control be less than the time it takes to load the receiving buffer from RXDATA. The loading time is 128 RXCLKs.

If the receiving buffer is fully loaded before the reading buffer is empty IRQ' will be asserted when the packet ends and the status register will report a receive buffer overflow error.

The LNC transmits and receives serial data on an IEEE 802 CSMA/CD defined communications medium and transfers parallel data to and from a host system under program or DMA control according to the IEEE 802 data link specification.

Serial data is transferred synchronously in and out of the LNC in frames. Each data frame or packet consists of a Preamble Field 51, Delimiter Field 52, Destination Address Field 53, Source Address Field 54, Length Count Field 55, Data Field 56, Pad Field 57, and CRC Frame Check Sum 58, as shown in FIG. 5.

The Preamble Field 51 consists of 62 bits of alternating 1's and 0's.

The Delimiter Field 52 consists of two consecutive 13 s following the preamble.

The Destination and Source Addresses Fields 53 and 54 are each either 2 or 6 bytes in length. Addresses may be any one of the following three types: Station Address, Logical Group, or Broadcast. Logical Group and Broadcast Addresses are identified by a 1 in the first bit position. The first bit of a Station Address is 0.

The Length Count field 55 is 2 bytes length and specifies the data field length (in an Ethernet application this field is optional and the Mode Register is required to be initialized appropriately).

The minimum size is 64 bytes.

The maximum data field length is programmed into the DMAC device operating with the LNC.

The Data Field 56 can have a variable size.

If the data field is less than 38 bytes, in a 6 byte address mode, or less than 46 in a 2 byte address mode, pad bytes 57 are added to the frame on transmission to bring the overall packet size up to 64 bytes.

The CRC field 58 is 4 bytes in length.

The Receiver consists of the following sections: Delimiter Recognition 34, Receive CRC 35, Serial-to-Parallel 36, Length Counter 37, Address Compare 38, and a 32 byte FIFO register file 33. These registers are all driven or loaded by RXCLK or a derivative.

In the absence of serial input data on RXDATA the SENSE input from the transceiver is inactive. The Receive Clock (RXCLK) is free running and the Receiver front end is idling.

The beginning of a frame is defined by the assertion of SENSE. The rising edge of RXCLK enables SENSE and concurrently the first Preamble bit on RXDATA to the LNC, the next vising edge of RXCLK latches the data into the LNC. The next falling edge of RXCLK shifts the first bit of the Preamble into the Delimiter Recognition 34 and SENSE into the SENSE Detection logic. Delimiter Recognition is deferred for eight RXCLKS after the assertion of SENSE, to give the MI unit time to synch on the Preamble.

If sequential zeros are detected during the time the LNC is searching for the double ones delimiter, the packet's reception is aborted.

The Preamble bits are shifted through the Delimiter Recognition logic without result. As the last bit of the Delimiter is shifted in, an internal signal is asserted.

The data is then routed to the Receive CRC 35 and the Serial-to-Parallel register 36. The Byte Alignment and Odd/Eve byte monitor is initialized, and a Byte Counter is started.

At the appropriate byte count the first byte of Destination Address is converted to parallel data, compared with the first byte of Station Address and loaded into the Receive FIFO 33.

Figure 4:
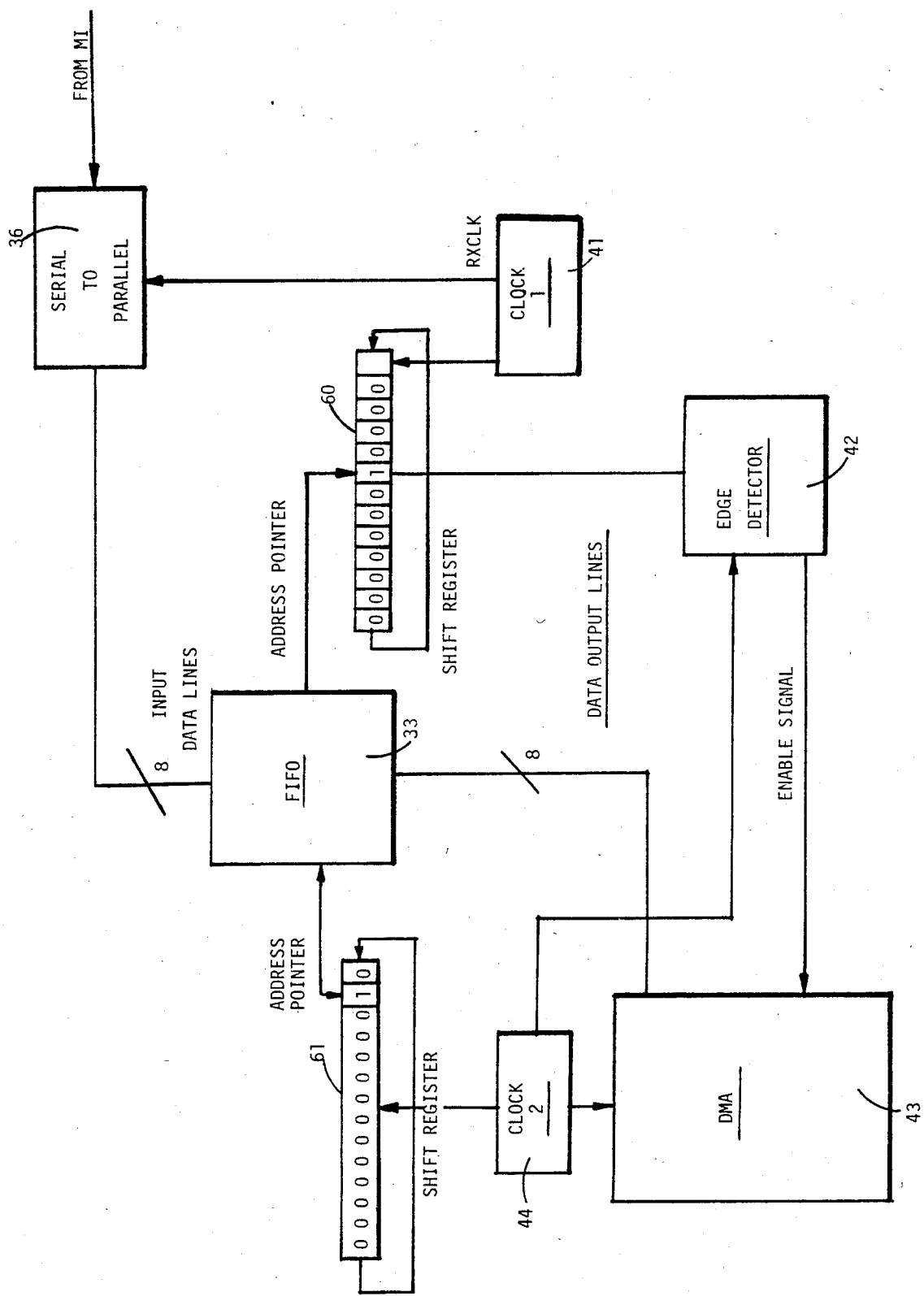
FIG. 4 is a detailed circuit diagram indicating the interface between the two portions of the local area network controller chip, one portion operating at the clock speed of the cable, the other portion operating at the clock speed of the computer.

The Receive FIFO input pointer 60 (RIP) shown in FIG. 4 is then advanced by one. The next bytes of destination and source address are loaded in the same manner. As the two length count bytes are sent to the Receive FIFO 33 they are also loaded into the Length Counter 37. If this field is non-zero it is decremented on each succeeding byte of the packet.

The remainder of the first 16 bytes of the packet are loaded into the Receive FIFO 33 (unless the Length Counter 37 hits its terminal count or the packet terminates).

With 16 bytes buffered, the Receive FIFO 33 is half full. RXREQ' is now asserted, the receiving half of the buffer becomes the reading half, and the first 16 bytes of receive data are unloaded by advancing the Receive Output Pointer 61 (ROP) shown in FIG. 4 as a function of the DMAC's DACK' and Data Strobe signals. Meanwhile the empty, receiving half, of the Receiver Data Buffer 33 continues to fill.

As the 32 and byte of received data is loaded, RXREQ is asserted again and RIP 60 proceeds to the just emptied reading buffer while DMA bus cycles unload the new reading buffer.

The Receive FIFO 33 continues to load and unload in this manner throughout the duration of the packet's Data Field.

The position of RIP 60 is used to indicate when to load the length Counter from the data stream, when to check for a Valid Address, when to assert or negate RXREQ' and to flag an overrun of the receive DMA service.

The Length Counter is loaded either 4 or 12 bytes (depending on the address mode) after Valid Delimiter. The Length Counter is decremented every 8 RXCLKs. When the Length Counter equals zero, indicating the end of the data field, RIP is disabled and RXREQ' is asserted long enough to unload the last bytes.

In the case of a normal termination of the packet, after the last bytes are unloaded, the Receiver asserts DONE' concurrent with the last DACK' strobe and negates RXREQ'. The CRC Register continues to calculate over the PAD and Frame Check Sum Fields and the Byte Alignment Checker continues to run until packet end. The state of the Odd/Even byte checker is latched at the time of the Length Counter's TC.

The end of the packet is recognized as follows. The last FCS bit is shifted in as RXCLK goes low in the normal manner. Two RXCLKs later the negated value of SENSE is shifted in. At the next rising edge of RXCLK the CRC syndrome is compared and the result is posted to the Status Register and IRQ' is asserted.

If during the course of a reception the data byte count held by the system exceeds the maximum number, a maximum frame size error is flagged by the DMAC. The LNC responds by negating RXREQ' and clearing the Status Register without generating an IRQ'.

The Transmitter consists of the following: Parallel-to-Serial register 39, Transmit Length Counter 40, 32 byte Transmitter FIFO file register 30, Transmit CRC Generator 41, Delimiter and Preamble Generator 42, Jam Generator 43, Interframe Delay Counter, and the Binary Exponential Back-off generator 44. These sections are all driven by TXCLK or a derivative.

Frame transmission commences with a MPU write to the Command Register setting the Transmit bit. The LNC responds by asserting Transmit DMA Request (TXREQ'). Under DMA control the MPU then loads 16 bytes of the Transmitter FIFO file register 30 by advancing the Transmit Input Pointer (TIP) as a function of DACK' and DS', the LNC then negates TXREQ' until the first byte of this data has been serialized out.

While the first 16 bytes are being loaded the LNC is monitoring the SENSE' input. When SENSE' is negated the Transmitter waits 96 TXCLKS (strict IEEE 802 or Ethernet application, otherwise the delay follows whatever is programmed into Mode register bits 5-7) and then serializes out the first byte of data on TXDATA if the Transmit FIFO is half full (if it's not half full yet the LNC returns to monitoring SENSE'). If SENSE' is active the LNC waits until it is negated and then starts the Inter Frame Delay Counter.

At the terminal count the first preamble bits are shifted out under TXCLK control and the transmitter begins to monitor the SIGQUAL' input. At the same time TXREQ' is asserted again and another 16 byte data burst is transferred into the empty half of the FIFO.

As the Transmit FIFO Output Pointer (TOP) advances to the first byte of the most recently filled half of the buffer, TXREQ' is again asserted to reload the half just emptied.

Upon the assertion of the DONE' input at the time of the last byte or word transfer, the transmitter finishes serializing the last bytes out, zeros the Transmit FIFO Input Pointer (TIP) and serializes the contents of the CRC register out on TXDATA.

If SIGQUAL' is asserted by the MI during the first 512 TXCLKS the LNC assumes there has been a collision between its own transmission and that of another node in the network.

The response of the LNC at its MI interface is to abort the frame transmission after appending a Jam signal consisting of 48 alternating zeros and ones to it. The jam signal is sent whenever the LNC has successfully contended for the medium and then been interrupted in its transmission during the collision window.

The response of the LNC at its MPU/DMAC interface to a collision is programmable to one of two modes by a write to the Mode Register at power up.

This allows for the LNC to be used with DMACs of differing capabilities. Specifically, some DMACs need to be reinitialized by the MPU if they are to restart a block transfer that has been aborted by a peripherals assertion of a DONE'. Others are capable of automatically re-starting a block by themselves if a DONE' is detected during a transfer.

Mode One: IRQ' plus DONE' on collision.

If SIGQUAL' is asserted within 512 TXCLKS after transmission begins, the appropriate Signal Quality code is sent to the encoded Transmit field in the Status Register (010 for collision) and the Collision count field is incremented by one. Next, IRQ' is asserted, and the contents of the Interrupt Vector register is output on the data bus when IACK' is asserted. This vector will result in a read of the status register from which the MPU will be required to reload the DMAC with the recently aborted data packet.

Meanwhile the LNC is sending the jam followed by a delay interval determined by the Binary Exponential Back-off counter.

At the end of this time interval the LNC begins to transmit the preamble and delimiter again if the transmit buffer has been reloaded in with the first 16 bytes of the packet.

The MPU is required to process the interrupt, reload the DMAC with the unsuccessfully transmitted packet, and respond to the resultant TXREQ' by loading the first 16 bytes of packet data into the transmit FIFO. If this is not finished by the time the jam signal and the back-off delay interval are over with, the LNC will continue to wait for data.

Mode Two: DONE' on collision only.

Upon the assertion of SIGQUAL' during the first 512 TX CLKs the LNC zeros TIP, asserts Done' to the DMAC concurrent with the next DACK' signal, increments the retry count and remains in the transmit mode (TXREQ' asserted etc.), the Jam is sent, and the Back-off delay is observed. In the meantime 16 bytes of data are loaded into the Transmit FIFO by the DMAC. The packet is then transmitted as before.

FIG. 4 is a detailed circuit diagram indicating the portion of the local area network controller in which data is transferred from one portion operating at the clock speed of the cable to the other portion of the controller which operates at the clock speed of the computer. The receive data buffer or FIFO 33 has been described above. Data from the serial to parallel register 36 supplies data to the FIFO 33 over the data input lines shown in the Figure. The write address of the FIFO is supplied by means of a shift register in point pointer 60. The shift register 60 is driven by the RXCLKS clock signal represented by box 41. The RXCLK signal is derived from the Manchester cable interface device and is therefore synchronous with the data rate present on the coaxial cable. In the preferred embodiment according to the present invention the shift register contains 32 bits, 31 of the bits being zero bits and one of the bits being a one bit. The location of the one bit or pointer bit with respect to the 32 bit positions in the shift register corresponds to and points to the memory location in the FIFO 33 in which the data from the de-serializer is to transmit the data into such memory location. The shift register 60 is connected to an edge detector 42. The edge detector 42 detects a signal transition indicative that a predetermined number of bit positions with respect to the 32 bit positions in the shift register have been cycled through by the pointer bit. In a preferred embodiment according to the present invention, when the pointer bit cycles through 16 bit positions the edge detector will generate an enabling signal after the pointer bit has moved 8 bit positions. The enable signal will be output from the edge detector 42 to a DMA unit (direct memory access) unit 43. The DMA unit is connected to the data output lines from the FIFO unit 33. The receive output pointer or shift register 61 is driven by the clock 2 represented by block 44 which represents the clock on the system bus. The shift register 61 circulates according to the data rate of the clock 2 or the data rate on the system bus. The clock 2 signal is also connected to the DMA unit 43 and the edge detector 42. The shift register 61 operates as a address pointer to the location of the memory address in the FIFO 33 where data is to be read by the DMA unit 43. Upon receiving the enable signal from the edge detector 42, the DMA unit 43 accesses the memory location in the FIFO 33 indicated by the address pointer 61. The shift register 61 is similar to the shift register 60 in that it is composed of 32 bits, 31 of which are zero and one of which is a 1 bit which designates the specific one of the memory locations in the FIFO 33 which data is to be read on the data output lines connected to the FIFO 33. Since the enable signal from the edge detector 42 occurs after an indeterminate period of time after receiving the edge detect from the shift register 60, the system shift register 61 is operated asynchronously of the shift register 60. More particularly this reflects the fact that the clock to 44 or system clock is independent or asynchronous of the RXCLK or cable clock designated by clock 1 or the block 41 in FIG. 4. After data is accessed by the DMA unit 43 it is transferred to the systems data bus (not shown) where it is then used and processed by the microprocessor system. Reference may be made to FIG. 2 to indicate a typical embodiment of a DMA unit connected to the local area network controller together with other elements of the microcomputer for processing data placed upon the data bus.

ETHERNET DATA LINK CONTROL (DLC) FUNCTIONAL DESCRIPTION

FRAME FORMAT

On an Ethernet communications network, information is transmitted and received in packets or frames. An Ethernet frame consists of a preamble, two address fields, a type field, an information field, and a frame check sequence. Each field has a specific format which is described in detail below. An Ethernet frame has a minimum length of 64 bytes exclusive of the preamble, and a maximum length of 1518 bytes also exclusive of the preamble. The Ethernet frame format is shown below.

| PREAMBLE | DESTINATION | SOURCE | TYPE | DATA | FCS |
|---|---|---|---|---|---|

NOTE: Field length in bytes in (parens).

PREAMBLE: The preamble is a 64 bit field consisting of 62 alternating "1"s and "0"s followed by a "11" End-of-Preamble indicator.

DESTINATION ADDRESS: The Destination Address is a 6 byte field containing either a specific Station Address, a Broadcast Address, or a Multicast Address that this frame is directed to.

SOURCE ADDRESS: The Source Address is a 6 byte field containing the specific Station Address from which this frame originated.

TYPE FIELD: The Type Field consists of two bytes. This field is uninterpreted at the Data Link Layer, and is passed through the DLC to be handled at the Client Layer.

DATA FIELD: The Data Field consists of 46 to 1500 bytes of information which are fully transparent in the sense that any arbitrary sequence of bytes may occur.

FRAME CHECK SEQUENCE: The Frame Check Sequence field is a 32-bit cyclic redundancy check (CRC) value computed as a function of the Destination Address Field, Source Address Field, Type Field, and Data Field. The FCS is appended to each transmitted frame, and used at reception to determine if the received frame is valid.

TRANSMITTING

The transmit data stream consists of the Preamble four information fields, and the FCS which is computed in real time by the DLC and automatically appended to the frame at the end of the serial data. The preamble is also generated by the DLC and transmitted immediately prior to the Destination Address. Destination Address, Source Address, Type Field and Data Field are prepared in the buffer memory prior to initiating transmission, and pass through the transmitting DLC in a transparent manner.

TRANSMISSION INITIATION/DEFERRAL

The Ethernet node initiates a transmission by storing the entire information content of the frame to be transmitted in an external buffer memory, and then transferring initial frame bytes to the DLC transmit FIFO. "Transmit-buffer to FIFO" transfers are coordinated via the DACK and TXREQ handshake interface, i.e., bytes are written to the FIFO via DACK only when TXREQ is HIGH. Actual transmission of the data onto the network will only occur if the net has not been busy for the minimum defer time (9.6 usec) and any Back-off time requirements have been satisfied. When transmission begins, the DLC activates the transceiver enable (TxEN) line concurrently with the transmission of the first bit of the preamble and keeps it active for the duration of the transmission.

COLLISION

When concurrent transmissions from two or more Ethernet nodes occur, (collision), the DLC halts the transmission of the data bytes in the transmit FIFO and trasmits a Jam pattern consisting of 55555555 Hex. At the end of the Jam transmission, the DLC completely halts transmission, issues a DONE signal to the CPU, and begins the Back-off wait period.

To reinitiate transmission, the intial bytes of the frame information field must be reloaded into the DLC transmit FIFO, the DONE is used to indicate to the Buffer Manager the need for frame reinitialization. The reloading of the Transmit FIFO may be done prior to the Back-off interval elapsing, so that no additional delay need be incurred to retransmission.

Scheduling of retransmission is determined by a controlled randomization process called Truncated Binary Exponential Back-off. The DLC waits a random interval between 1 and $2^{**}K$ slot times (51.2 usec per slot time) before attempting retransmission, where "K" is the current transmission attempt number (not to exceed 10).

When 16 consecutive attempts have been made at transmission and all have been terminated due to collision, the DLC transmit processor sets an error status bit and issues an interrupt to the CPU if enabled for such.

TERMINATING TRANSMISSION

Transmission terminates under the following conditions: NORMAL: The frame has been transmitted successfully without contention. Loading of the last data byte into the transmit FIFO is signaled to the EDLC by activation of the DONE signal concurrently with the last byte of data loaded into the transmit FIFO. This line acts as a ninth bit for the Transmit FIFO. An interrupt will then be generated requesting the host to read transmission status.

COLLISION

Transmission attempted by two or more Ethernet nodes. The Jam sequence is transmitted, the Collision status bit is set, and the Back-off interval begun.

UNDERFLOW

Transmit data is not ready when needed for transmission. Once transmission has begun, the DLC on average requires one transmit byte every 800 nsec in order to avoid transmit FIFO underflow (starvation). If this condition occurs, the DLC terminates the transmission and sets the Transmit Underflow status bit.

16 TRANSMISSION ATTEMPTS

A collision occurs for the sixteenth consecutive time. The 16-Transmission-Attempts status bit is set. The Collision status bit is not set if this is the sixteenth collision. TxRET signal is generated, and the back-off interval begun.

At the completion of every transmission or retransmission, new status information is loaded into the Transmit Status Register. Dependent upon the bits enabled in the Transmit Command Register, an interrupt will be generated for the just completed transmission. In both collision and underflow the DONE signal is activated.

RECEIVING

The DLC is continuously monitoring the network. When activity is recognized via the Carrier Sense (SENSE) line going active, the DLC synchronizes itself to the incoming data stream during the Preamble, and then examines the destination address field of the frame. Depending on the Address Match Mode specified, the DLC will either recognize the frame as being addressed to itself in a general or specific fashion or abort the frame reception.

PREAMBLE PROCESSING

The LDC recognizes activity on the Ethernet via the Carrier Sense line. The Preamble is normally 64 bits (8 bytes) long. The Preamble consists of a sequence of 62 alternating "1"s and "0"s followed by 11, with the frame information fields immediately following. In order for the decoder phase-lock to occur, the DLC waits 8 bit times before looking for the 11, end of preamble indicator. If the EDLC receives a 00 before receiving the 11 in the preamble, an error condition has occurred, the frame is not received, and the EDLC begins monitoring the network for a carrier again.

ADDRESS MATCHING

Ethernet addresses consist of a 6 byte field IEEE 802.3 includes the option of a 2 byte field. The first bit of the address signifies whether it is a Station address or a Multicast/Broadcast address.

| First Bit | Address |
|---|---|
| 0 | Station Address (Physical) |
| 1 | Multicast/Broadcast Address (logical) |

Address matching occurs as follows:

STATION ADDRESS

All destination address bytes must match, in order, those found in the 6 byte or 2 byte station address register.

MULTICAST ADDRESS

If the first bit of the incoming address is a 1, and the DLC is programmed to accept Multicast addresses, the frame is received. In all other cases, the DLC will ignore the incoming frame.

BROADCAST ADDRESS

The 2 or six incoming destination address bytes must all be FF hex.

If the incoming frame is addressed to the DLC specifically (Destination address matches the contents of the station address register), or is of general or group interest (Broadcast or Multicast and in the case of 802.3 the pad field Address), the DLC will pass the frame exclusive of preamble and FCS to the CPU buffer and indicate any error conditions at the end of frame. If however the address does not match the DLC does not signal the host and the packet passes thru the DLC without result.

The DLC may be programmed to respond to no address (Disable Receiver), all addressee (Promiscuous), Station/Broadcast, or Station/Broadcast/Multicast via the mode bits.

TERMINATING RECEPTION

Reception is terminated when either of the following conditions occur:

CARRIER SENSE INACTIVE

Indicates the carrier is no longer present on the Ethernet cable.

OVERFLOW

The host node for some reason is not able to empty the receive FIFO as rapidly as it is filled, an error occurs as frame data is lost.

The LNC contains the following registers which are used to define, control, and monitor the data communications process.

After the initialization period, all MPU write operations always write to the Command Register and all MPU read operations always read the Status Register.

The Transmitter data buffer can only be loaded and the Receiver data buffer can only be read in the DMA mode.

TABLE
LNC Accessible Registers

| Register | Size | Access | Mode |
|---|---|---|---|
| TRANSMIT FIFO REGISTER (TF) | 32 bytes | While TXREQ' is asserted | DMA WRITE |
| RECEIVE FIFO REGISTER (RF) | 32 bytes | While RXREQ' is asserted | DMA READ |
| MODE REGISTER (IM) | 2 bytes | In this sequence only, during initialization: CS',R/W' =MPU WRITE (write one word or two consecutive bytes) | |
| INTERRUPT VECTOR REGISTER IV | 2 bytes | CS',R/W'=0 (write one word or two consecutive bytes) | MPU WRITE |
| STATION ADDRESS REGISTER (AR) | 2 or 6 bytes | CS',R/W'=0 (write 1 or 3 sequential words or 2 or 6 sequential bytes) After Initialization: | MPU WRITE |
| COMMAND REGISTER (CR) | 2 bytes | CS',R/W'=0 | MPU WRITE |
| STATUS REGISTER (SR) | 2 bytes | CS',R/W'=1 | MPU READ |

The Command register is used to control the operation of the LNC. (all command bits are active high, except Isolate: active low).

Bit # Definition
0: Transmit
1: Odd number of bytes in transmit block
2: Internal loopback test
3: Manchester loopback test
4: Isolate'
5: Receive all packets
6: Re-enable packet reception
7: Reset 8-15: Reserved for future use The Status register contains the status of the LNC operations. All non-encoded status bits are active high. All status changes cause an interrupt (IRQ') driven read of the status register which resets the encoded field and/or individual bit, unless noted differently below.

Bit # Definition 2-0 The Receive Field (bits 2-0 are double buffered)

000: Idle
001: Receive successful
010: Minimum packet size error
011: Receive buffer overflow
100: Frame error (termination on a non-byte boundary)
101: FCS error
110: Receive in progress (indicates a valid address has been recognized and DONE' hasn't been asserted yet. It is not reset to idle on a read of the status register. It does not generate an interrupt request).
3: Odd number of bytes in the receive packet (bit 3 is double buffered)

6-4 The Transmit Field

000: Idle
001: Transmit successful
010: Collision (SIGQUAL' is asserted during the first 512 bit times of transmission and Mode register bit 3 is asserted).
011: Signal Quality error (SIGQUAL' asserted after the first 512 bit times.)
100: Transmit retry count exceeded.
101: Transmit buffer underflow during transmission (indicates the TX FIFO running dry between the 16th data byte delivered for transmission and the assertion of DONE').
110: Transmit in progress (indicates the real time activity of the TXDATA pin. It is not reset to idle on a read of the status register. It does not generate an interrupt request.)
111: MAU changed state during transmission.
7: Heartbeat absent (part of the transmission algorithm is to listen for the heartbeat before posting transmit status. Concurrent with the transmit fields IRQ'.)
11-8: The Collision Count Field (reset when the transmit command is sent.)
12: MAU available flag (set when MAU is available, not reset when Status Register is read).
13: Initialized flag (cleared on hard or soft reset, set after last station address byte is written. Valuable only from a chip self test viewpoint).
14: Reserved for future use (reads zero)
15: Interrupt request The Mode Register is an 8 bit register. It is written by the MPU during initialization. All mode bits are active high.

Bit # Definition

0: Two byte Station Address size (default is 6)
1: Length Count field not used in packet format (default is LC field used)
2: Disable receiver after packet reception
3: Interrupt on collision (default is the assertion of DONE' only on collision)
4: 8 bit system bus (default is 16)
7-5 Set interframe wait time
000: 16 TX clocks
001: 32 TX clocks
010: 64 TX clocks
011: 96 TX clocks
111: 128 TX clocks The Interrupt Vector register is the second byte written to the LNC during initialization. This vector is read in response to the LNC's IRQ'. The vector is read and written on D0-D7.

Bit # Definition 7-0: Interrupt Vector (defaults to $0F on reset)

What is claimed is:

1. In data communications network having a plurality of information processing systems coupled to a communication channel which serially transmits data in the form of information packets at a first clock rate, a network controller disposed between said communication channel and an information processing system including a system data bus having associated therewith a second clock rate, comprising:

an interface unit connected to said communication channel for transferring data in the form of information packets to and from said channel;

a de-serializer connected to said interface unit for converting data in said information packet received from said channel from serial form to parallel form;

a receiver buffer connected to said de-serializer for storing in parallel form the data corresponding to a plurality of information packets transferred from said communication channel;

a first shift register having n bit positions including a first pointer bit, and circulating at a first clock rate corresponding to the clock rate of data on said communication channel, where n corresponds to the number of memory locations in said receive buffer, the location of said pointer bit with respect to said n bit positions in said first shift register corresponding to and pointing to the memory location in said receiver buffer wherein said data from said de-serializer is to transmit the data into said receive buffer; and a second shift register having n positions, including a second pointer bit, and circulating at said second clock rate corresponding to the clock rate of said system bus, the location of said second pointer bit with respect to said n bit positions corresponding to and pointing to the memory location in said receive buffer wherein data stored in said receive buffer is to be transferred to said system bus during the next memory cycle of said system bus.

2. A controller as defined in claim 1, further comprising an edge detector connected to said first shift register to detect a signal transition indicative that a predetermined number of bit positions with respect to said n bit positions have been cycled through by said first pointer bit, to generate an enabling signal therefrom.

3. A data communication system comprising:

a communication medium;

a plurality of transceivers coupled to said medium, each transceiver including transmitting means for transmitting a signal onto said medium, and receiving means for receiving a signal communicated on said medium by another transceiver;

collision detecting means coupled to the transmitting means and the receiving means of each transceiver for generating a collision signal whenever a signal communicated on said medium by another transceiver is received by said receiving means during the time said transmitting means is transmitting a signal onto said communicating medium;

means connected to each transceiver and responsive to the presence of said collision signal for interrupting the transmission of a signal onto said medium by said transmitting means;

means connected to each transceiver and responsive to the presence of a carrier signal on said channel for preventing the transmission of a signal by said transmitting means;

an interface unit connected to said transceiver for transferring data in the form of information packets to and from said communication medium;

a de-serializer connected to said interface unit for converting data in said information packet received from said transceiver from serial form to parallel form;

a receive buffer having n memory locations, where n is an integer, connected to said de-serializer for storing in parallel form the data in said information packets transferred from said communication channel;

a first shift register having n bit positions, and circulating at a first clock rate corresponding to the data rate of data transmitted in said communication medium where n corresponds to the number of memory locations in said receive buffer, the location of a pointer bit with respect to said n bit positions in said first shift register corresponding to and pointing to the m th memory location in said receive buffer wherein said data from said serializer is to transmit the data into said receive buffer during the next memory cycle; and a second shift register having n bit positions and circulating at a second clock rate corresponding to the clock rate of said system bus, said second shift register including a pointer bit having a location with respect to said n bit positions corresponding to and pointing to the m th memory location in said receive buffer wherein data in said receive buffer memory is to be transferred to said system bus during the next memory cycle of said system bus.

* * * * *